US008964787B2

United States Patent
McMullin et al.

(10) Patent No.: US 8,964,787 B2
(45) Date of Patent: Feb. 24, 2015

(54) PEER TO PEER WIRELESS COMMUNICATION SYSTEM

(75) Inventors: Roderick McMullin, Kanata (CA); Niclas Lewis, Ottawa (CA)

(73) Assignee: Thales Canada Inc., Toronto, ON (CA)

( * ) Notice: Subject to any disclaimer, the term of this patent is extended or adjusted under 35 U.S.C. 154(b) by 573 days.

(21) Appl. No.: 12/787,620

(22) Filed: May 26, 2010

(65) Prior Publication Data

US 2010/0303014 A1 Dec. 2, 2010

Related U.S. Application Data

(60) Provisional application No. 61/181,443, filed on May 27, 2009.

(51) Int. Cl.
| | |
|---|---|
| H04B 7/14 | (2006.01) |
| H04W 84/18 | (2009.01) |
| H04M 1/60 | (2006.01) |
| H04W 4/10 | (2009.01) |
| H04W 76/00 | (2009.01) |
| H04L 29/08 | (2006.01) |

(52) U.S. Cl.
CPC ............ *H04W 84/18* (2013.01); *H04M 1/6066* (2013.01); *H04W 4/10* (2013.01); *H04W 76/005* (2013.01); *H04L 67/12* (2013.01)
USPC .......................... 370/492; 455/41.2; 455/90.3

(58) Field of Classification Search
USPC ......... 370/310, 315, 464, 465, 466, 468, 492; 455/41.1, 41.2, 550.1, 553.1, 556.1, 455/556.2, 569.1, 570, 575.1, 575.6, 575.8, 455/90.2, 90.3
See application file for complete search history.

(56) References Cited

U.S. PATENT DOCUMENTS

| | | | | |
|---|---|---|---|---|
| 6,968,153 | B1 * | 11/2005 | Heinonen et al. | 455/11.1 |
| 7,174,187 | B1 * | 2/2007 | Ngan | 455/552.1 |
| 7,525,933 | B1 * | 4/2009 | Hall | 370/310 |
| 7,586,888 | B2 * | 9/2009 | Wang | 370/338 |
| 2003/0224787 | A1 * | 12/2003 | Gandolfo | 455/434 |
| 2004/0203351 | A1 * | 10/2004 | Shearer et al. | 455/41.1 |
| 2004/0255001 | A1 * | 12/2004 | Oh et al. | 709/209 |
| 2005/0175009 | A1 * | 8/2005 | Bauer | 370/390 |
| 2005/0254471 | A1 * | 11/2005 | Zhang et al. | 370/338 |
| 2006/0167784 | A1 * | 7/2006 | Hoffberg | 705/37 |
| 2007/0037568 | A1 * | 2/2007 | Warner et al. | 455/422.1 |
| 2007/0082615 | A1 * | 4/2007 | Mak et al. | 455/41.2 |
| 2007/0165875 | A1 | 7/2007 | Rezvani et al. | |
| 2007/0168412 | A1 | 7/2007 | Devaul | |
| 2007/0298885 | A1 * | 12/2007 | Tran | 463/37 |
| 2008/0025329 | A1 * | 1/2008 | Livet et al. | 370/406 |
| 2008/0311966 | A1 * | 12/2008 | Klein | 455/575.2 |
| 2010/0042781 | A1 * | 2/2010 | Reuss | 711/115 |
| 2010/0210323 | A1 * | 8/2010 | Collins et al. | 455/575.1 |

* cited by examiner

*Primary Examiner* — Curtis A Alia
(74) *Attorney, Agent, or Firm* — Marks & Clerk (57) ABSTRACT

A wireless communication system includes a plurality of headsets, each embodying a wireless transceiver, and wherein communication can be established between the headsets via the wireless transceivers over a network in which the headsets act as nodes.

21 Claims, 10 Drawing Sheets

PEER TO PEER WIRELESS COMMUNICATION SYSTEM

CROSS REFERENCE TO RELATED APPLICATION

This application claims the benefit under 35 USC 119(e) of prior U.S. application Ser. No. 61/181,443, filed May 27, 2009, the contents of which are herein incorporated by reference.

FIELD OF THE INVENTION

This invention relates to the field of wireless communications, and more particularly to wireless communication systems suitable for intercommunication among mobile personnel, particularly, but not exclusively, during military operations.

BACKGROUND OF THE INVENTION

There is a need for soldiers in the field to have an effective means of communication with their peers in the immediate neighborhood. While such communication can sometimes be done verbally or with hand signals, it is increasingly being done with radios. Such radios need to be light, free of cabling that could encumber the soldier, and consume little power to minimize the battery requirements, both in terms of weight and battery life.

Prior art systems require the use of a headset and separate radio interconnected by a cable or series of cables. Such systems are cumbersome and may interfere with the soldier's ability to operate other equipment.

Such systems often require the soldier to manually disconnect the headset from the radio and plug the headset into a vehicle intercom system when transitioning from dismounted to vehicle-based operations. They must also be hard-wired to other sensors (for example position reporting devices) in order to communicate sensor data over the network.

SUMMARY OF THE INVENTION

In one aspect of the invention a radio capability is embedded within a headset, thereby leaving the soldier without the burden of cabling, or the volume, weight, reliability and logistics burden of a separate radio unit. An additional aspect of the invention is to employ software to extend the range of the headset-radio by having the radios of other soldiers repeat the voice signal.

A further aspect of the invention is to embed the radio capability into other soldier carried devices which can in turn join the network and communicate. One such soldier-carried device is a wireless controller that binds with an individual headset and provides wireless remote control of the headset.

Thus, embodiments of the invention provide a wireless communication system, comprising a plurality of headsets and other wireless enabled devices, each embodying a wireless transceiver, and wherein communication can be established between said headsets via said wireless transceivers. The system preferably employs a mesh network using Internet Protocol, although it will be understood that other protocols known to persons skilled in the art can be employed. The transceiver can comprise a separate transmitter and receiver, or include common sections.

According to one aspect of the invention there is provided a wireless communication system, comprising a plurality of headsets, each incorporating a wireless communications module comprising a power source, a microphone, a speaker, a wireless transceiver, memory, and a processor responsive to instructions stored in the memory to control operation of the wireless communications module to establish a communication network with the wireless communications modules incorporated in the headsets acting as nodes in the network.

The wireless transceiver is preferably a miniaturized radio component carrying digitized voice and data that can be embedded within the electronics module of an active noise cancelling Ear Protection System, thereby providing the soldier who dons an Ear Protection System the additional and full capability of radio communications without the burden of any additional cables or batteries. This offers a significant reduction in volume and weight associated with carrying a separate radio and electronic hearing protection unit. The transceiver can also consist of a separate transmitter and receiver.

In one embodiment, the miniaturized radio component can also be embedded within the electronics module of another radio, for example a group radio shared by a number of soldiers, where due to cost, size, weight, range, security, etc, it is not practical to equip all soldiers with that radio. In this case, each soldier can have controlled access to the use of the group radio(s), for example, for long distance communication. In this case, the local transceiver in the headset provides a communication link to the group radio.

The group radio may be, for example, a vehicle intercommunication system, thereby allowing soldiers to communicate directly with other people connected to the vehicle's intercommunications system, and to communicate through the vehicle's intercommunications to other parties.

The headset-radio can be provided with a GPS receiver permitting each soldier to continuously present his position to others; and to receive the position of others. The GPS signal, or the coordinates of the soldier, can be sent automatically over the network to his peers.

As the miniaturized radio component provides point to multipoint digital communications to carry digitized voice, it can also be integrated with other digital data devices for the soldier; for example integrating it with a display or camera would enable the transmission and reception of maps, pictures, position information, etc. The state of the art today for such capabilities burdens the solder with size, weight, and power requirements beyond those offered by embodiments of the invention.

The miniaturized radio component can also be equipped with encrypting and decrypting capabilities to enable secure exchange of information, including voice, between soldiers.

The system can be packaged to be thrown or dropped, even covertly, allowing users to listen, communicate, sense, repeat and or report from the point where it is placed.

In one embodiment, the users of the system can configure and select from an array of multiple radio channels and multiple logical channels within a radio channel. Communication groups (parties capable of communication with each other) can be established and modified while communications are actively occurring.

The system can automatically find the best radio frequency channel (e.g., the channel with the least amount of pre-existing radio frequency energy) to operate on, and if conditions change then the system can automatically and transparently to the user select another more optimal frequency.

Static networks (fixed nodes) can be assigned or de-assigned. Ad hoc networks similarly can be established, allowing IP and IP like communications through mobile or static nodes.

Software algorithms based on time of arrival or received signal strength can be employed to provide or supplement the absolute or relative position of other nodes in the network.

The invention can be implemented in the form of a fully integrated headset that integrates all of the components into a single assembly. It can also be implemented as a standalone module that is designed to integrate the functionality into various vehicle borne systems, including a vehicle mounted intercom system.

The invention also provides an integrated body worn system whereby the analog voice signals and user interface are provided to the radio system through a separate active hearing protection system allowing the user to communicate through the transceiver and benefit from an active hearing protection system simultaneously.

The headsets may include a user interface residing on the headset itself or a user interface residing on a linked wireless controller. Alternatively, there may be user interface controls on the both on the headset and a linked wireless controller, similar to a remote, such as a key fob for an automobile. The two sets of user interface controls may be mirrored or different to allow for extended functionality for the operator.

In another aspect the invention provides a headset for incorporation into a wireless communication system enabling communication among a group of users, said headset incorporated a wireless transceiver integrated therein to enable communication between like headsets over radio links forming a wireless packet network.

BRIEF DESCRIPTION OF THE DRAWINGS

The invention will now be described in more detail, by way of example only, with reference to the accompanying drawings, in which:—

FIGS. 4a and 4b illustrate, from opposite sides, an actual earpiece for headset in accordance with one embodiment of the invention, while FIG. 4c shows a side view;

DETAILED DESCRIPTION OF THE PREFERRED EMBODIMENTS

An embodiment of the invention comprises a headset subsystem, an interface module to an external communication system, such as SOTAS, which is a digital communication system developed by Thales, and a wireless controller module. A management subsystem may also be provided as required.

Figure 1:
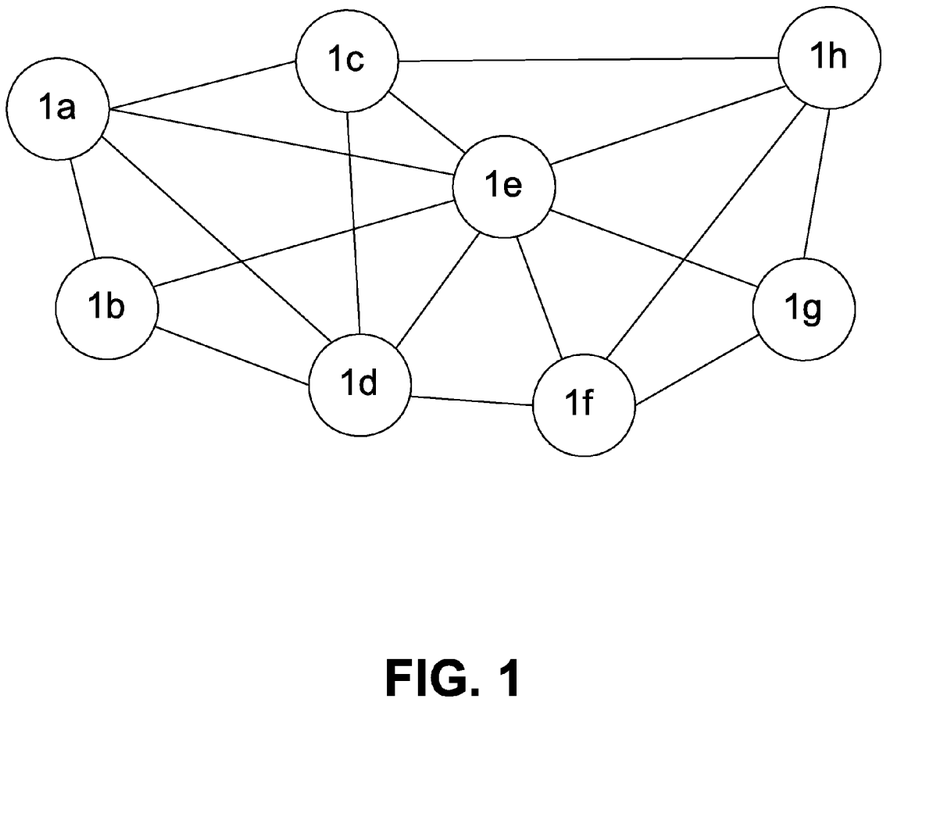
FIG. 1 shows a set of headsets forming a mesh network.

The headset subsystem typically comprises eight or more headsets 1a ... 1f as shown in FIG. 1. The headsets form a peer-to-peer mesh network with radio links 2 between them. For example, in FIG. 1, headset 1a can reach headsets 1b, 1c, 1e, and 1d directly, but to reach headset 1h must pass through another headset, for example, 1e, which acts as a repeater.

Each headset includes the physical means to transfer audio to a human ear, namely a speaker, the physical means to collect audio spoken by a human, namely a microphone, the physical means to transmit microphone audio wirelessly to all other headsets, namely a transmitter, the physical means to receive microphone audio wirelessly from all other headsets, namely a receiver, a Push To Talk (PTT) switch, a volume control, a means to turn the system on and off, a self-contained power supply (battery), and a connector interface to the Management Subsystem.

Figure 2:
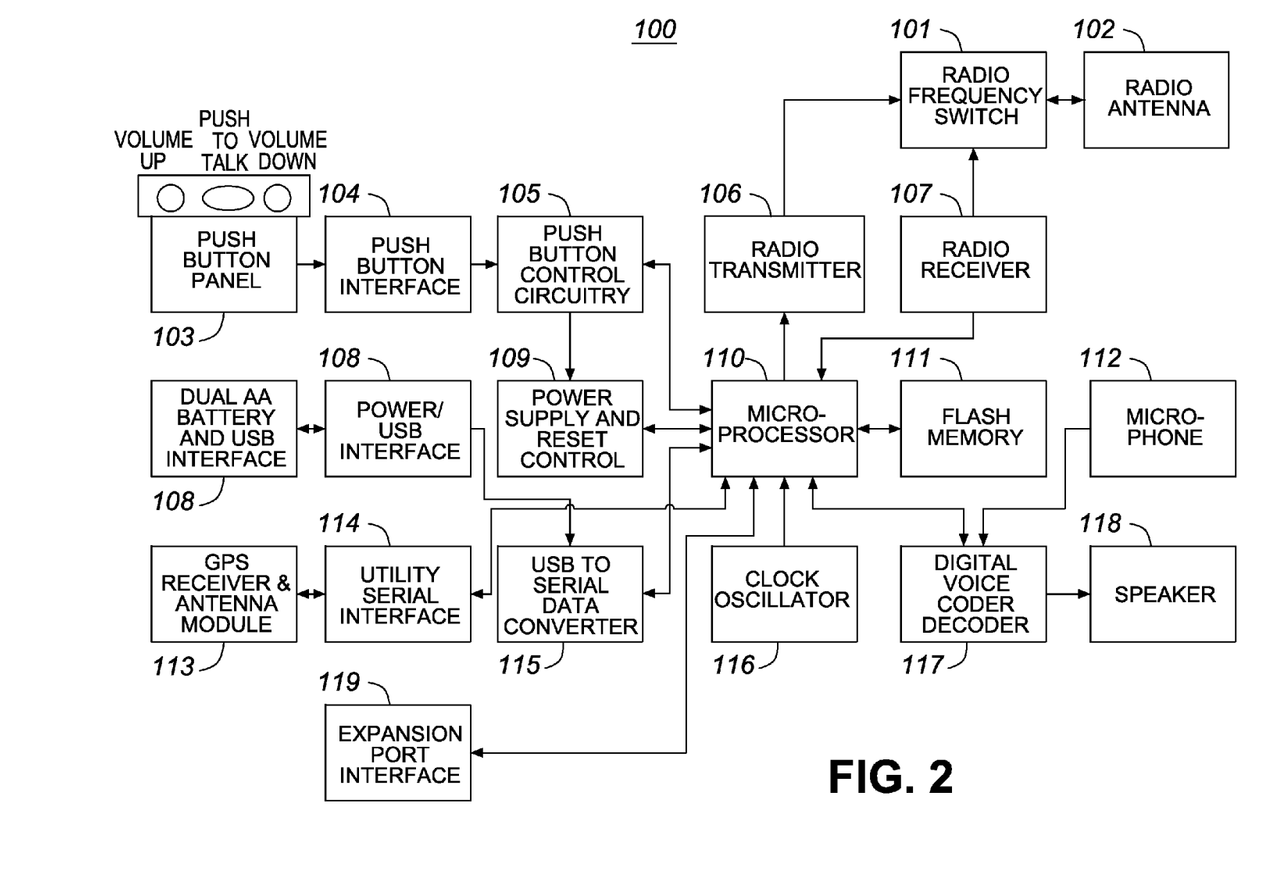
FIG. 2 is a system level block diagram of a Wireless Communications Module for a wireless communication system in accordance with one embodiment of the invention.

In FIG. 2 is a block diagram of an electronics module 100 that is incorporated in a headset, although it may also be incorporated in the interface module to the external communication system. In particular, the electronics module shown in FIG. 2 comprises a radio transmitter 106 and a radio receiver 107 that are connected to a radio antenna 102 through a digitally controlled radio frequency switch 101, which is controlled by microprocessor 110.

The microprocessor 110 executes embedded software stored in non-volatile flash memory 111 and is clocked by an optional external clock oscillator 116. The microprocessor 110 is connected to a digital voice coder/decoder chip 117, which digitizes voice samples collected from a microphone 112 and reconstructs analog voice samples into a signal that drives an external speaker 118.

The user control interface is provided by a three-component momentary contact touch panel switch 103, which provides power on/off, volume up/down and PTT functionality. This is connected through a flex cable push button interface 104 to push button control circuitry 105. This controls the time constants for turning on and off of the unit, which is initiated by pressing two of the control panel buttons simultaneously.

The push button control circuitry controls the state of the power supply regulators in the power supply and reset control. The microprocessor 110 also connects to the push button control circuitry 105 and Power Supply and Reset Control Circuit 109.

The whole system is powered by a power supply 108 that is provided with at least one AA battery cell. If two batteries are provided and they are nearing their point of exhaustion it is possible to replace the batteries, one at a time without powering off the system.

A Universal Serial Bus (USB) to serial Data converter 115 provides a management and data port that is connected to the microprocessor 110. A Global Positioning System (GPS) receiver module 113 can also be connected to the microprocessor 106 through a Utility Serial Interface 114.

An Expansion Port Interface 119 is provided to incorporate the unit into other systems. This interface provides a series of programmable digital input and output lines; a series of analog signal inputs; a series of analog signal outputs; a series of comparator inputs; and basic module control signals, such as power enable, volume up/down and system clocks. The Expansion port interface can also be used to connect to a management subsystem for programming the wireless controller module.

The voice signal from the microphone 112 may also be subject to signal processing to reduce ambient noise.

Figure 3:
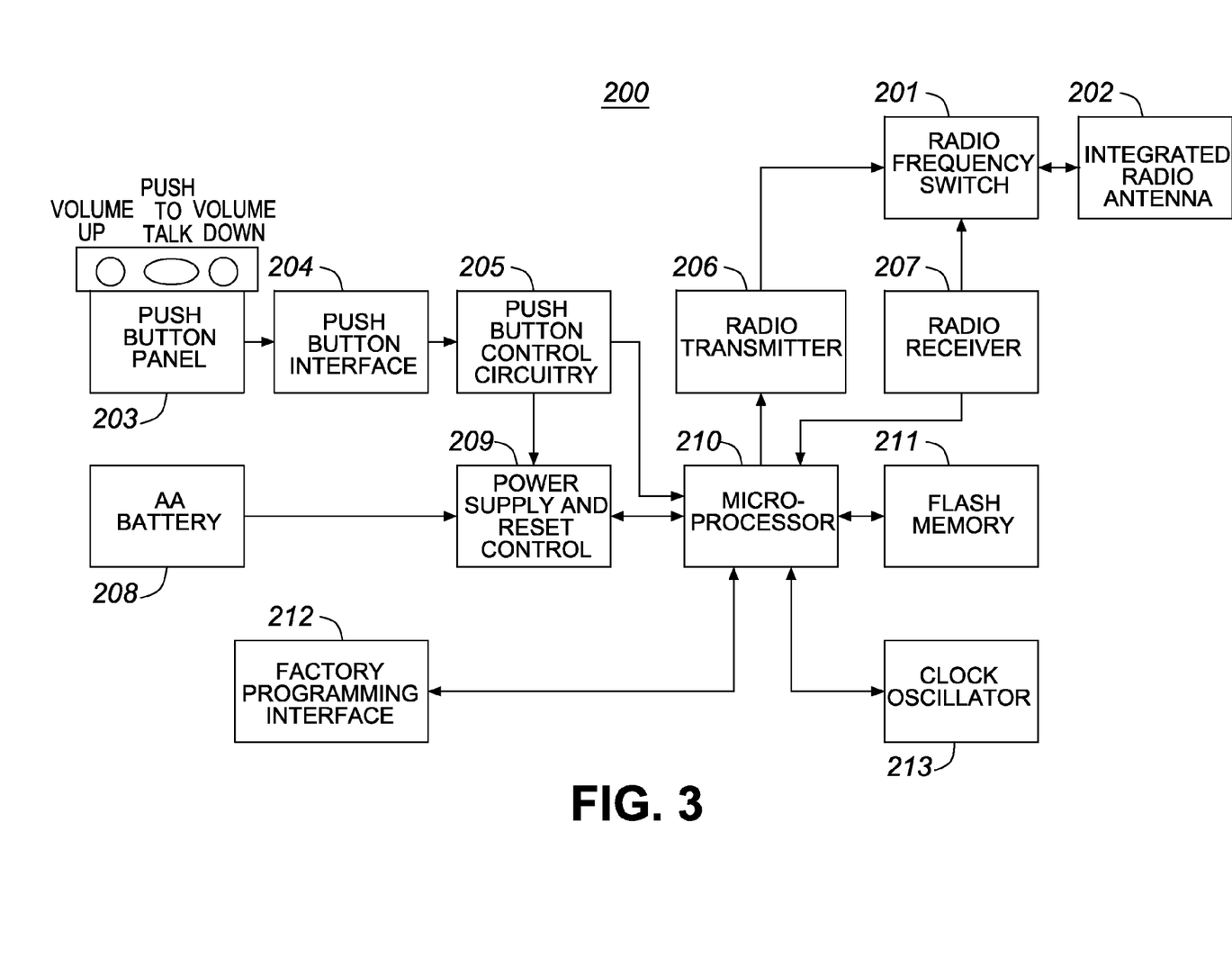
FIG. 3 is a system level block diagram of a Wireless Controller Module in accordance with one embodiment of the invention.

In FIG. 3 is a block diagram of the Wireless Controller Module 200. This is a subset of the Wireless Communications Module shown in FIG. 2. It serves two functions: First, it acts as a remote controller for the headset, so that, for example, if an operator is not able to access the controls on the headset, perhaps because he needs to handle a weapon, he can control it through the wireless communications module, which duplicates some of the functions of the controls on the headset, such as the PTT switch, and the volume controls. However, the wireless communications controller is designed so that in addition to acting as a remote controller for a headset, it could also act as a node in the network and, for example, relay messages or act as an egress or ingress node for other data that might need to be distributed over the network.

FIG. 3 comprises a radio transmitter 206 and a radio receiver 207 that are connected to a radio antenna 202 through a digitally controlled radio frequency switch 201 controlled by microprocessor 210. In this the radio transmitter is a low power module and the antenna is an embedded printed F antenna. The microprocessor 210 executes embedded software stored in non-volatile flash memory 211 and is clocked by an optional external clock oscillator 213. The user control interface is provided by a three momentary contact touch panel switch 203 that remotely provide volume up/down and PTT functionality. This is connected through a flex cable push button interface 204 to push button control circuitry 205. For this module, where battery longevity is important then entire module is in a powered off state unless a push button is depressed. The push button control circuitry 205 controls the state of the power supply regulators in the power supply and reset control 209. The microprocessor also connects to the push button control circuitry 205 and Power Supply and Reset Control Circuit 209. This means that the function and operation of each button can be determined by the software that is running on the microprocessor. The whole system is powered by a power supply 209 that is driven by, in one example, one AA battery cell 208.

The radio transceiver (consisting of the Radio Transmitter 106, Radio Receiver 107 and Radio Frequency Switch 101) establishes the physical link 2 between transceivers in the network. In this instance, a radio transceiver utilizing the IEEE 802.15.4 air interface is used, although other technologies may be suitable. However, an advantage of the IEEE 802.15.4 standard is that it is designed for specifically for low power operation at modest data rates, typically 250 kb/s, and therefore employs a simple and robust modulation scheme that requires a low channel bandwidth, meaning that for a given power, it can offer greater operating range than a broadband system. The same networking protocols are used to communicate between the Wireless Controller Module and Wireless Communications Module which may operate on the same frequency. As such the Wireless Controller is fully integrated into the same RF network as the Wireless Communications Module.

In this example, the radio transceiver is closely integrated with the microprocessor module 110 to exploit opportunities for low power operation and implementation of flexible software defined channel access procedures. This allows the flexibility to accommodate future sensor and communication devices which can be integrated into the same communications network.

The Digital Voice Coder Decoder (CODEC) 117 translates the electrical signals from analog input and output devices into a digital bitstream for processing by the microprocessor 110. Analog voice is received by a microphone 112, and amplified and digitized by the CODEC 117 device. The digitized stream is then transported as a serial bitstream to the microprocessor 110, which performs further data rate compression and packetization ready for wireless transmission by the Radio Transmitter 106. In one example, an ADPCM is used to perform the compression function, but other compression functions could also be used.

In the reverse direction, a wireless signal is received by the antenna 102, and applied to the Radio Receiver 107 through the Radio Frequency Switch 101 where it is converted to receive packets ready for decoding by the microprocessor 110. These packets are received, checked for errors and re-assembled into a serial data stream of samples representing the voice and data packets transmitted. The voice samples are further decoded by an ADPCM decoder and applied to the CODEC 117 where they are reconstituted into an analog representation of the original voice, amplified and applied to a loudspeaker. Other data streams, including digital representations of other analog signals (e.g., temperature and biometric sensors), GPS position reports and other management data can also be digitized and applied to a microprocessor for transport simultaneously with the voice samples.

The microprocessor 110 performs various functions in the system, and in particular it receives and processes the digitized information from the analog interface, receives and processes the digitized information from the digital sensors, multiplexes the data sources together and applies to a physical layer for transmission, controls a user interface, and manages the radio interface to provide a radio frequency data transport mechanism.

The power supply enables operation in excess of 12 hours with small batteries. In one example, the battery system consists of two commonly available AA batteries, which should provide at least 10 hours of transmission time. This is one of the advantages of using the relatively narrow band and low power IEEE 802.15 air interface. The system can also be integrated with a centralized battery system that may be provided by a broader system (e.g., an integrated soldier system or other vehicle platform power supply).

The Radio Antenna 102 transforms the modulated radio frequency signals into a radiated field for reception by other transceivers in the network.

Figures 4A, 4C:
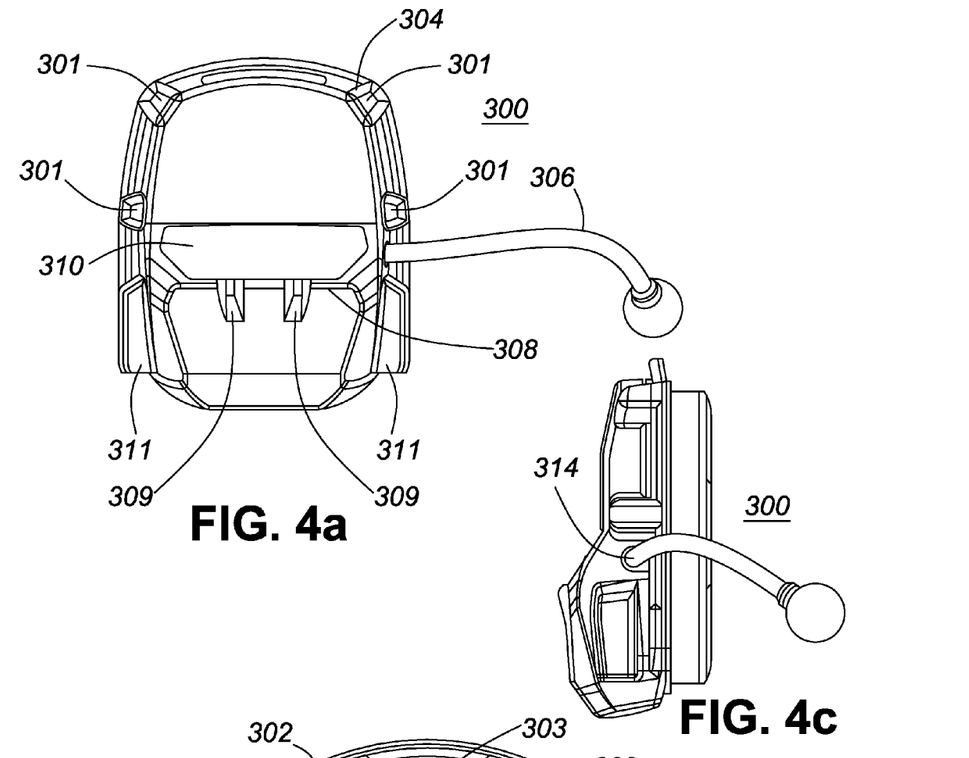
Figure 4B:
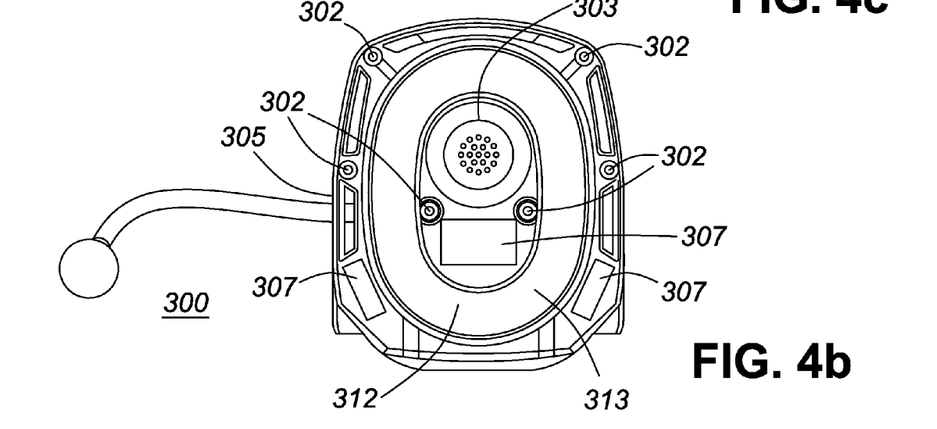

The system shown in FIG. 2 is integrated together onto three printed circuit board assemblies, which are packaged into an application specific package as shown in FIGS. 4a to 4c. One circuit board contains the Dual Battery and USB Interface 108. Another circuit board contains the Push Button Panel 103 and, finally, the third circuit board contains all of the remaining modules. In one example, an optional GPS module 113 is also included so that position data can be collected and carried alongside the voice samples.

The Main Wireless Headset Enclosure 300 houses the electronics shown in FIG. 2. The entire wireless communications module can be mounted in one headset designed to be held against one ear by a simple fabric headband strap (not shown) as is typical with most single ear headphone retaining systems. Of course, another headset, which could be just a dummy headset, could be held against the other ear.

In FIGS. 4a to 4c the headband strap attachment slots 301 accept an elastic and mesh headband that is used to secure the wireless headset against the users ear. The slots are designed in such a way to allow comfortable position of the headband when the headset is configured for left or right ear mounting. The microphone boom 306 can be mounted into a slot on the right or left side of the unit to accommodate the different mounting configurations. The microphone is held into each respective side of the unit with a small angled retaining insert 314.

On the front of the unit is a push button panel 310 which is used to control the operation of the unit, including power on/off, volume control and push to talk functions. Features are included just beneath this panel 309 to help the user locate the panel and establish the relative position of the buttons through touch alone. Beneath the push button panel is a battery compartment. A battery compartment door 308 is secured to the main housing with screw type battery compartment fasteners. When the door is fastened in position it forms an environmentally sealed enclosure to protect the batteries. No tools are required to remove and affix the door. The interior face of the main housing 305 is attached to the exterior face with five rear panel fasteners 302. These fasteners are located in such a way to optimally compress an internal gasket to provide environmental sealing. An oval rim 312 accepts a snap in replaceable vinyl covered foam pad 313. A speaker grill allows sound to exit the housing and protects the internal speaker from damage. Finally there are several label areas 307 to attach product and regulatory labels.

Figure 5A:
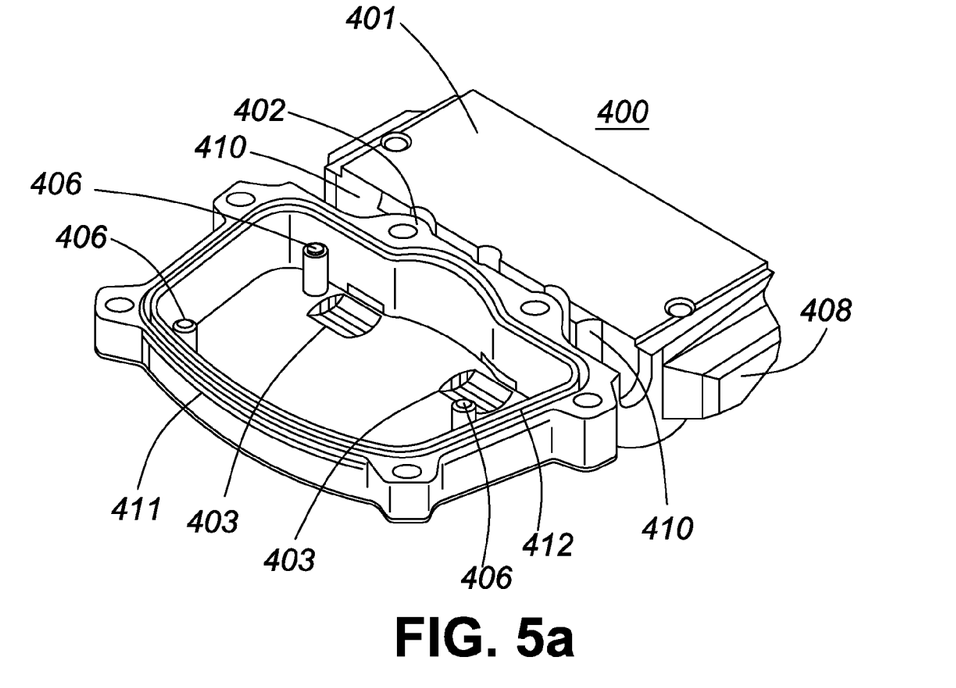
FIGS. 5a and 5b show the Front Panel of the Wireless Headset Enclosure.
Figure 5B:
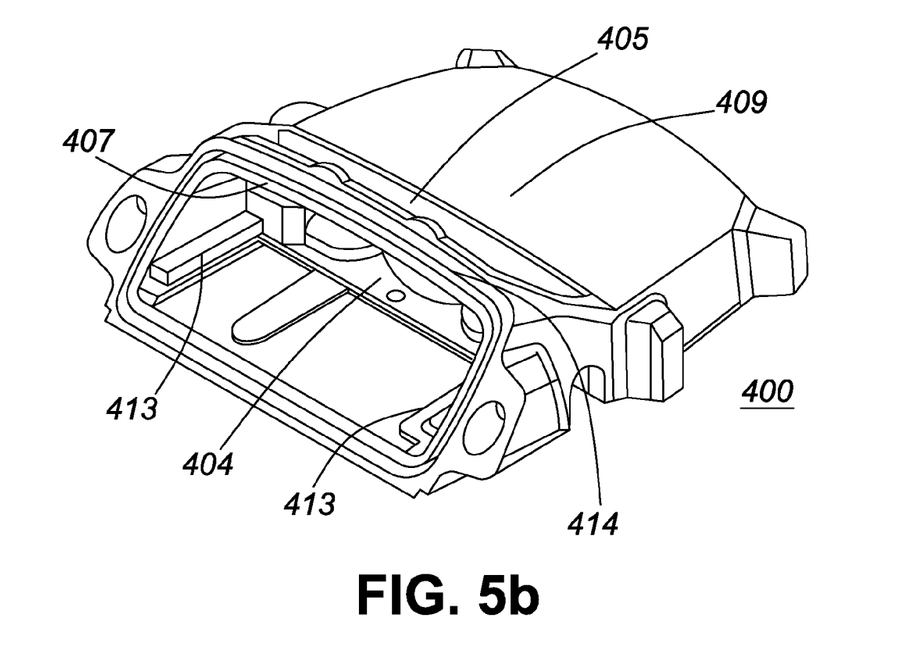

FIGS. 5a and 5b show the front panel of the housing including the cable chase 402 for channelling the wires from the microphone into an environmentally sealed enclosure. Just below this cable chase are cavities that receive and hold the microphone boom retaining clip 410. Once the entire housing is assembled this holds the microphone boom securely in place. At the top of the front panel is a cavity that holds the main electronics module. This incorporates features for retaining the PCB 406 and for retaining a small GPS or other sensor module 412. There is a groove that accepts a compressible O-ring gasket 411 to environmentally seal this cavity once the whole unit is assembled. Connector clearance area 403 allows the overall depth of the unit to be minimized while accommodating the internal electronics.

The exterior face of the front panel 408 shows the inside of the battery compartment. This contains two friction side mount holders 413 that retain the battery and USB PCB without requiring additional fasteners. Also within this cavity are a cable chase for the pushbutton panel cable 404 and a concealed cable chase to connect the battery board with the main PCB. Both of these small cable chases are environmentally sealed when the final unit is assembled. The bottom of the front panel has a groove to accept a compressible O-ring gasket 407 to environmentally seal the battery compartment when the battery door is attached.

Figure 6A:
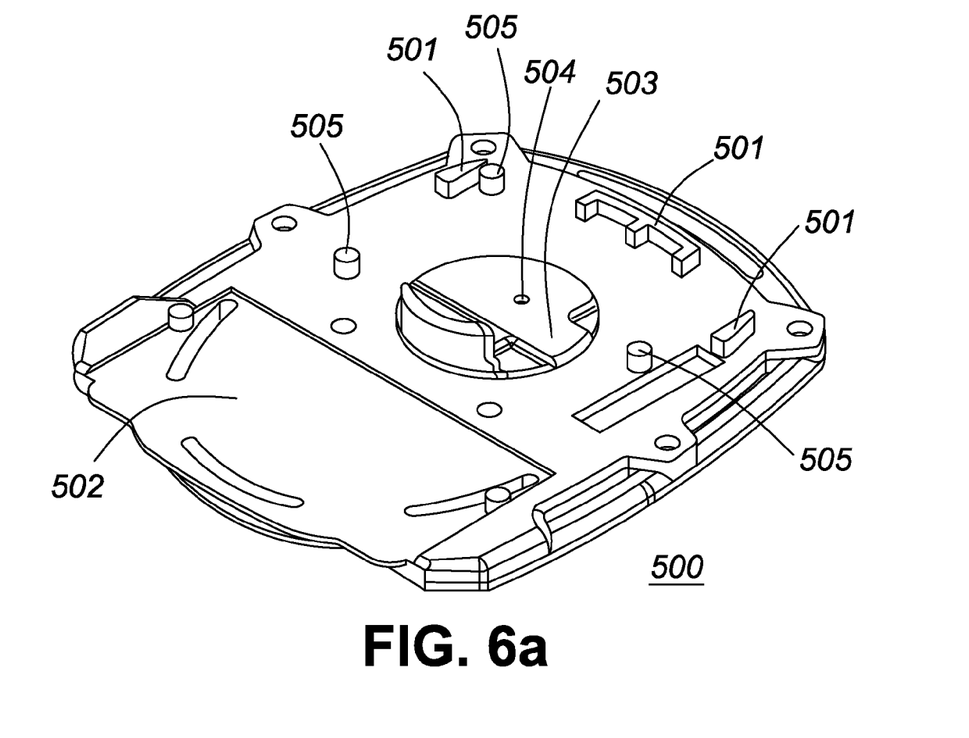
FIGS. 6a and 6b shows the Rear Panel of the Main Enclosure 500.
Figure 6B:
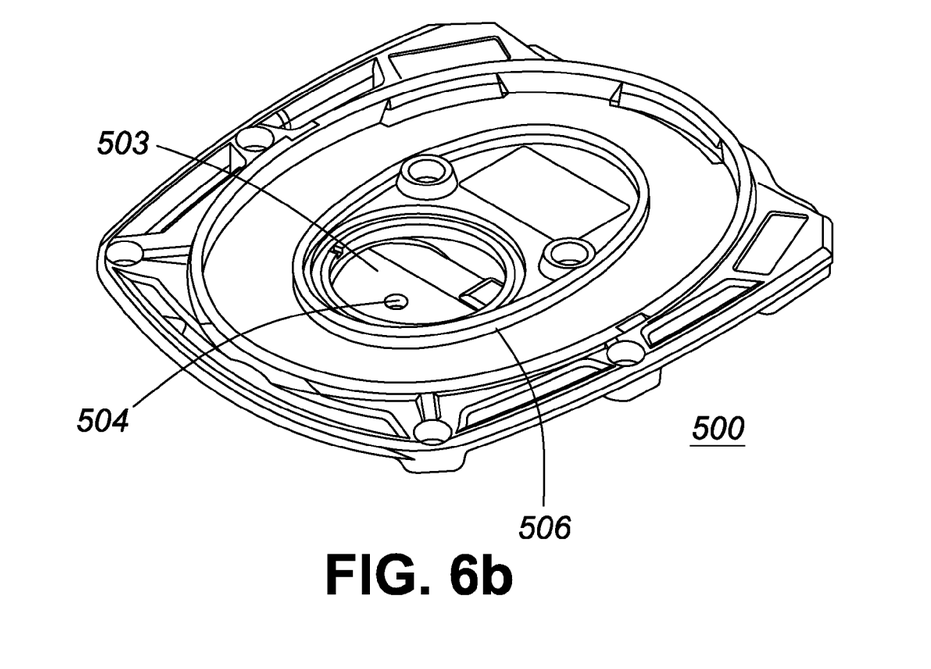

FIGS. 6a and 6b show the rear panel of the main enclosure 500. A set of rear panel guide assembly features 501 align the rear housing within the front panel of the main housing. PCB retaining features 505 hold the main electronics within the main cavity of the front panel when fully assembled. The speaker is held within a small speaker cavity 503 which is shaped in such a way as to hold the speaker inside an environmentally sealed chamber (when the speaker wire feedthrough 504 is sealed with the appropriate sealer.

Figure 7A:
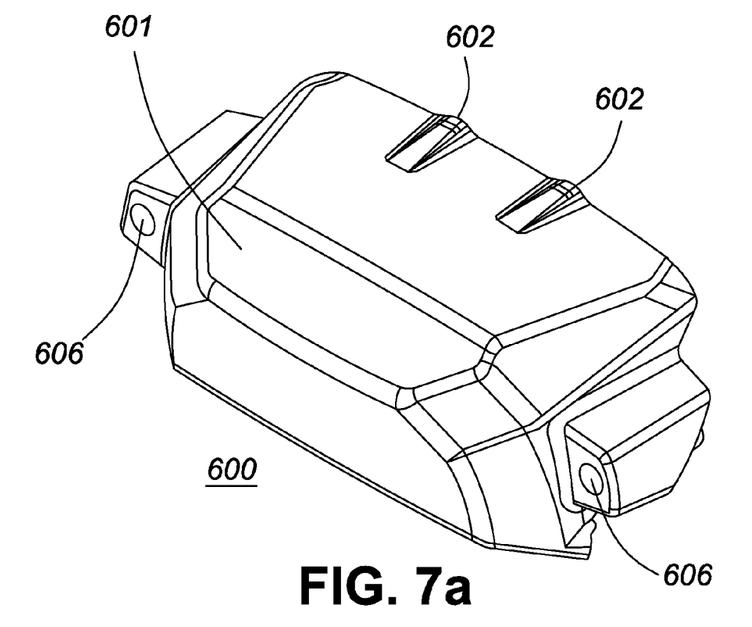
FIGS. 7a and 7b show the removable Battery Door Cover.
Figure 7B:
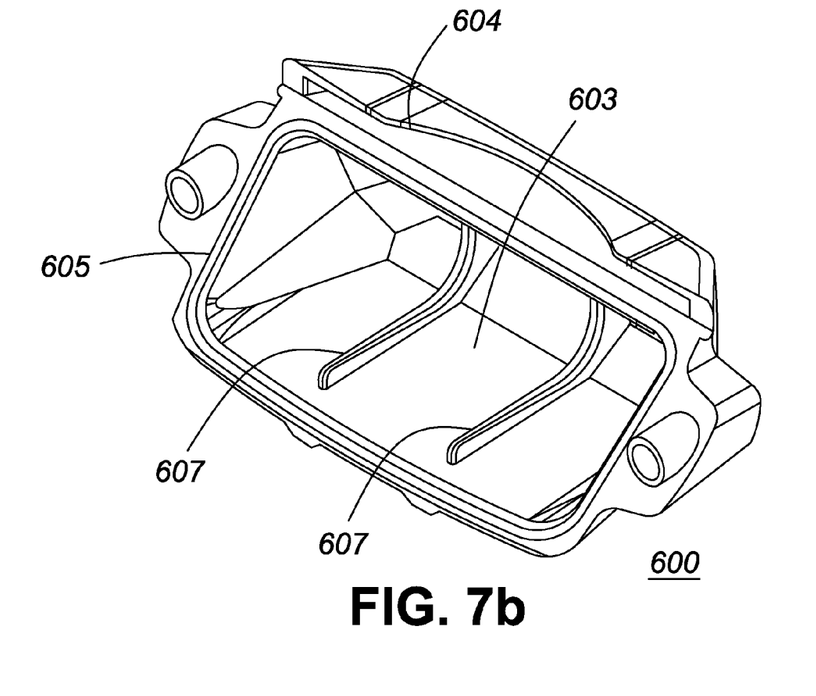

FIGS. 7a and 7b show the removable battery door cover 600. The outside of this part has two pushbutton location features 602 that, when mounted onto the main housing help the user locate and identify the buttons on the pushbutton panel. The attachment screw retaining features 606 hold a hand tightened screw fastener that allow the battery cover to be securely attached to the main housing. The inside surface of the battery cover has an area 605 to compress an environmental gasket on the main housing when attached. There are also two battery retaining features 607 which press and hold the batteries into their respective contacts when the battery door is secured.

Figure 8A:
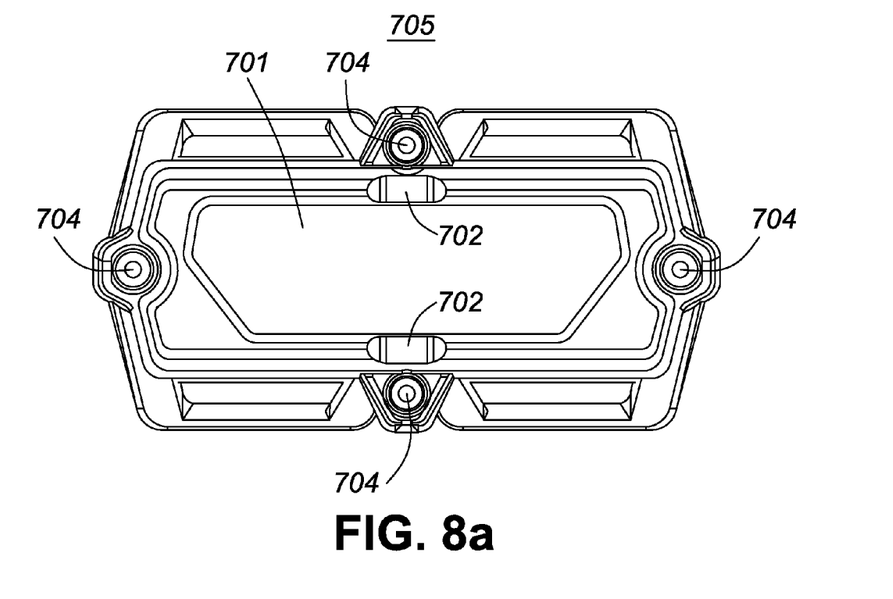
FIGS. 8a and 8b show the Wireless Controller Module.
Figure 8B:
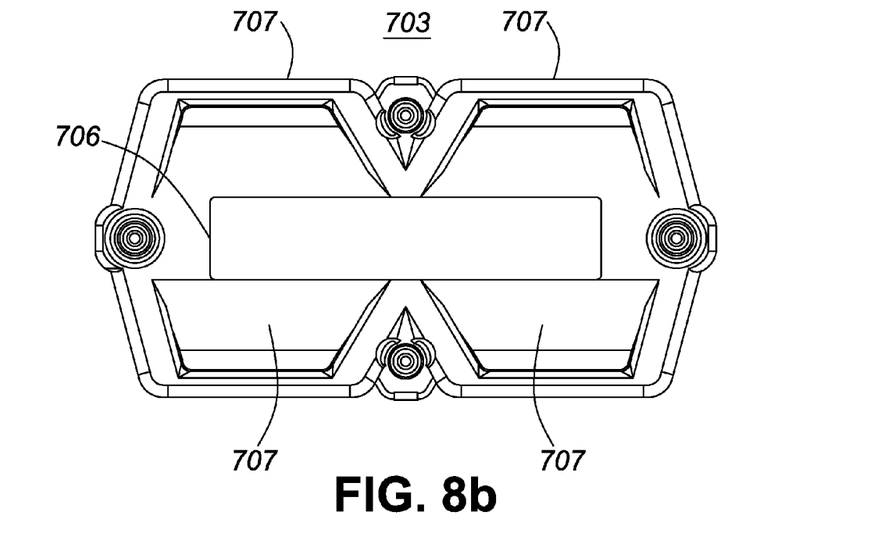

FIGS. 8a and 8b show the wireless controller module 700. The front surface of this module houses the identical push button panel 701 as the main housing. With the appropriate software this wireless controller module provides a remote wireless extension of the control panel on the main headset. As with the main housing, this enclosure also has a button location feature 702 to allow the user to locate and identify the buttons without visually seeing the unit. Four assembly screws 704 hold the two halves of the housing together and help to compress an environmental gasket. The other side of the controller has a polished label area 706 and mounting strap feature 707 that allow the unit to be affixed to a variety of clothing and platforms, including a tactical vest and other pieces of soldier worn equipment.

Figure 9A:
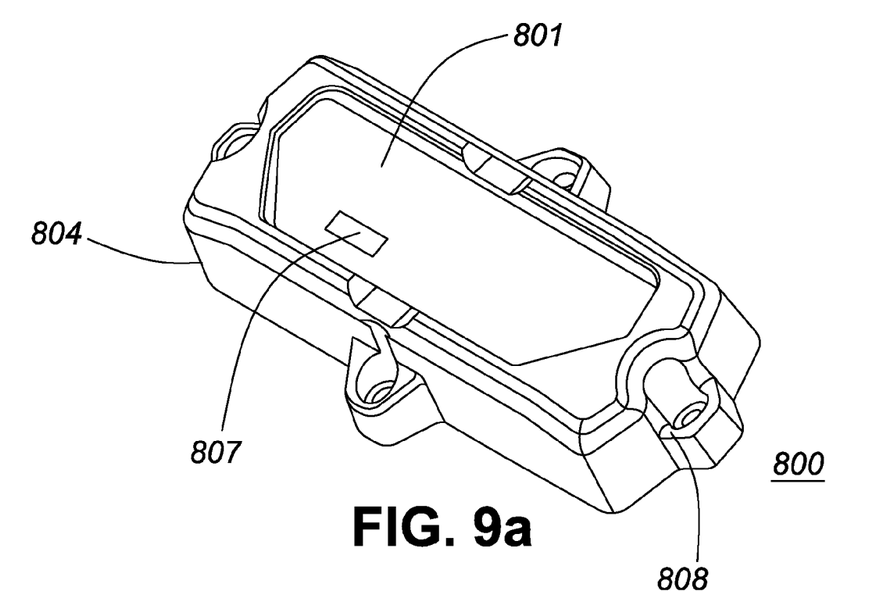
FIGS. 9a and 9b show the Front Panel of the Wireless Controller Module.
Figure 9B:
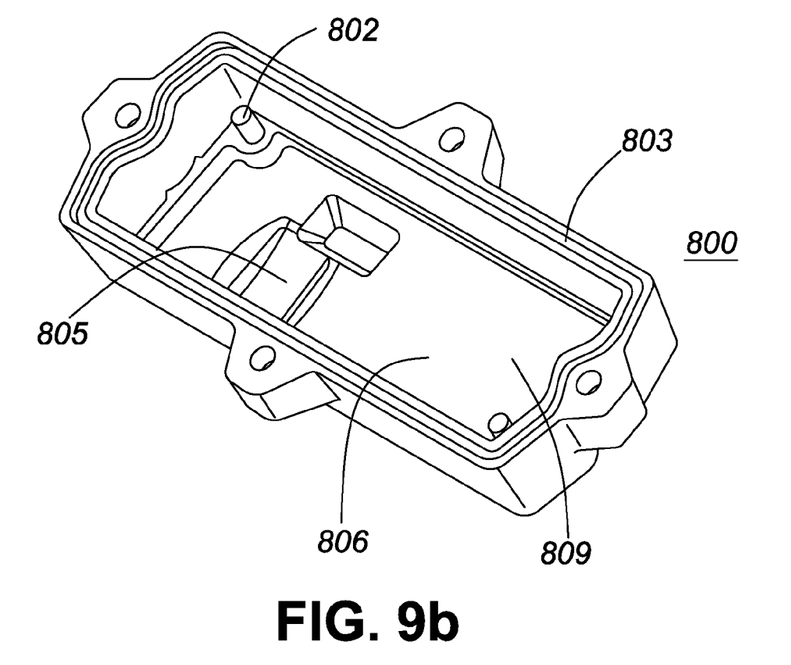

FIGS. 9a and 9b show the front panel of the wireless controller module 800. This has a polished label to accept the self adhesive push button panel 801. On this area there is a cable chase 807 to accept the flex-cable pigtail from the push button panel. This hole is environmentally sealed once the cable is inserted and the pushbutton panel is secured. The two sloped areas 808 are designed to accommodate ad-hoc mounting methods and are sloped in such a way as to retain and anchor, for example, self adhesive tape. The inside edge of the front panel has a groove to accept an environmental gasket 803. The PCB is mounted into the housing at the PCB mounting posts 802.

Figure 10A:
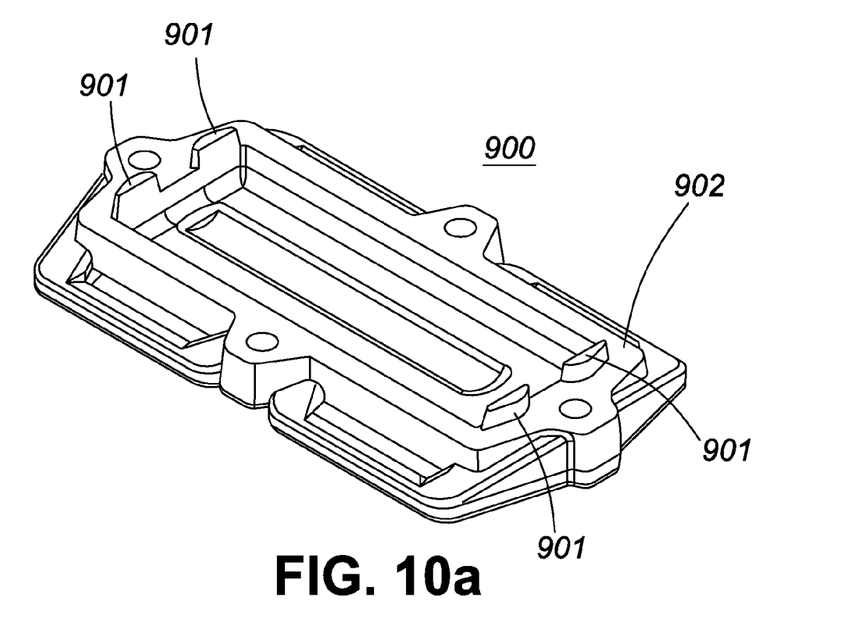
FIGS. 10a and 10b shows the Rear Panel of the Wireless Controller Module.
Figure 10B:
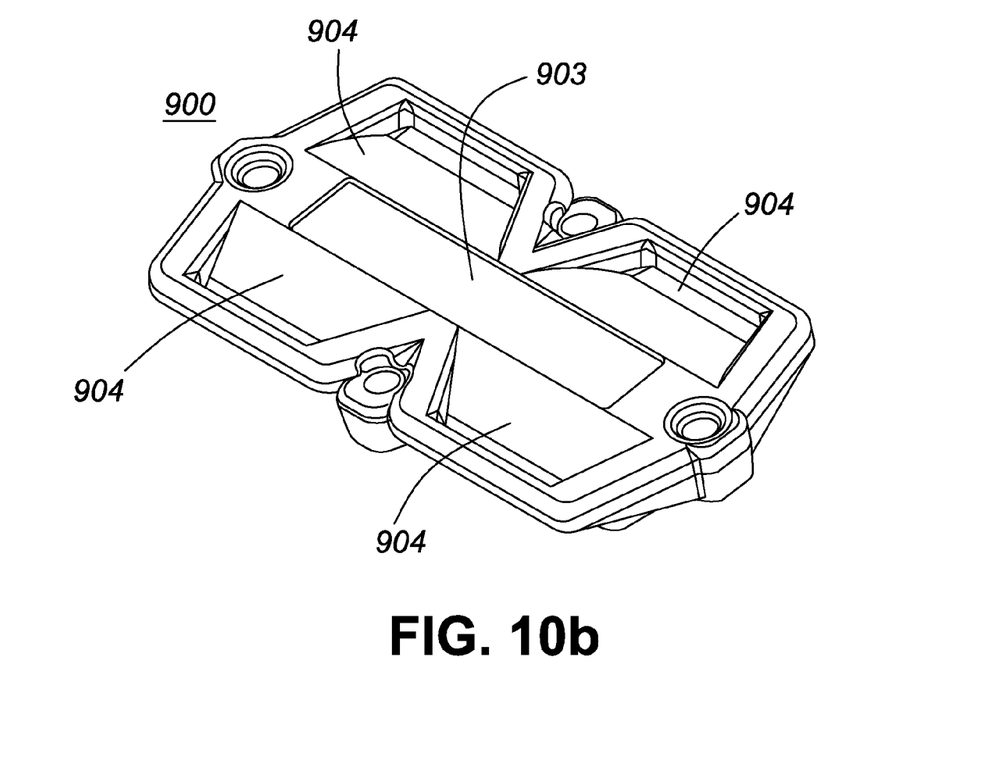

FIGS. 10a and 10b show the rear panel of the controller 900. The inside edge of this part has an area to compress the environmental gasket 902 when the unit is assembled. The sloped areas on the rear of the rear panel 904 are designed to allow for easy insertion and removal of mounting straps that may be used, for example, to mount the unit to a tactical vest.

The headset subsystem operates in a single channel half-duplex mode. When a user wearing the headset engages PTT, the headset collects voice input from the microphone 112 (the transmitter is not directly/immediately keyed by PTT) and presents it to the transmitter 106 for transmission. If the PTT is engaged, but the headset is not part of any network, the headset can return an audible indication to the user via the earphone.

Voice is transmitted from one headset to all other headsets using elements of the IEEE 802.15.4 standard, the contents of which are herein incorporated by reference. This requirement is met where the originating headset is in direct RF range or is 1 or 2 RF hops removed from any of the other receiving Headsets.

Voice data received from one originator is de-correlated from other originators and presented to the earphone. This operation is performed on a first-come first served basis; i.e., while a headset contains voice data from any originator that it is streaming to the earphone, it will continue to de-correlate this from other originators and continue streaming, even if this causes an overflow (a loss) of voice data received from another originator. When all voice data from a given headset has been streamed to the earphone, the next stream is tapped and fed to the earphone.

The CODEC is configured to provide audible background noise when there is received audio is being streamed to the Earphone. When the PTT is engaged, the headset provides side tone audio to the earphone.

The headsets are pre-configured to operate on a set of RF channels. On power-up each headset searches the set of pre-configured channels for the headset network operating channel. If no other headset can be reached, the headset establishes the network on the RF channel with the best quality. The recommended start-up procedure is to turn on one headset and let it first form the network. Once the network has been formed, all other headsets may be turned on. If the user does not follow the recommended start-up procedure, the software will make a best effort to merge all formed networks into one. This is accomplished by having all network formers set a timer after network formation for a random time within a range of 6 to 16 seconds. Upon this timer expiry, or someone joining the network former, the network former will scan all channels looking for another network. If other networks are found, all but one of the networks will reset, resulting in one merged network. If no networks are found after scanning all channels, a second channel scan is done upon expiry of a second random timer, set after the initial search for other networks, for a random time within a range of 2 to 5 seconds. Once the network former has completed any possible network merging activities, it begins to continuously assess the RF channel and coordinate modem or RF changes when the link state of the overall population would improve.

When the headset joins an existing network, or forms a network, a unique audible cue, a stair step of four short tones upward in frequency, is played for the user.

The headsets broadcast periodic data messages to all members of the network. These data messages contain information about the sender's device status and network knowledge. This allows each headset to maintain a list of devices it knows of, and their status. Due to packet rebroadcasting, devices not within range may still be known. Once sufficient device status is known, the headset with the best network knowledge takes on the role of network manager from the network former and begins to coordinate modem or RF changes. Re-election of the network manager is done when the current manager becomes lost or no longer has the best network knowledge.

The headsets monitor the system voltage and provide a unique audio cue, four short tones alternating in frequency repeated every sixty seconds, to the user when low voltage is present.

The headsets can be powered on using a combination of Volume up and Volume down pressed at the same time for at least three seconds. On power on, a unique audible cue, three short tones, is played for the user. With the exception of the power on combinations, the particular push button sequences are software defined.

The headsets can be powered off using a combination of Volume up and Volume down pressed at the same time for at least five seconds. During the power off sequence, a unique audible cue is played for the user. This cue is one medium tone per second followed by one long tone. The user may abort the power off sequence by removing either Volume up or Volume down at any time prior to the final long tone.

The headset volume control has a series of eight pre-defined levels. When a user changes the volume to a new level, a unique audible cue is played for the user, one short tone per step. No audible cue is played when a volume change is attempted and a higher or lower level volume is not possible. A volume change request is registered with the headset for each unique press and release of a volume button. A volume change request is also registered with the headset for each 250 milliseconds of sustained holding of the volume.

The headset PTT and volume controls may be controlled remotely by a small hand held wireless device. This remote wireless device contains three buttons, Volume up, Volume down and PTT. The remote wireless device is small enough that it may be mounted to a hand held device (e.g. to a weapon or flashlight) or concealed in a pocket. The remote wireless device can initiate binding by pressing and holding the remote device Volume up and Volume down. All headsets within range of the remote wireless device will hear a binding request audible cue, which is a stair step of eight short tones upward in frequency. The headset user accepts the binding request by pressing and holding both the headset Volume up and Volume down button until a binding success cue is heard (stair step of eight short tones upward in frequency). Once the remote wireless device is bound to the headset, communication to the headset is done in a point to point manner. The remote wireless device is in an off (powered down) state at all times when no button is pushed. The remote wireless device can be used to send Volume up, Volume down and PTT on messages to the headset. Once the remote wireless device is bound to a headset, the headset can be powered down. On subsequent headset power on, the use of any buttons on the remote wireless device will trigger a re-find of the headset, provided the headset has not selected the same RF channel it was previously on. The remote wireless device will re-find the headset and send the appropriate message within a time delay that is not significant for the user (roughly 350 milliseconds maximum). The remote wireless device monitors its system voltage and sends a message to the headset indicating low voltage on each button press operation when the voltage becomes low. The headset will provide a unique audio cue, four short tones with the same frequency repeated each time the PTT button of the remote wireless device is pressed (but at most once every 60 seconds), to the user when low voltage is present on the remote wireless device.

The headset software will disable audio transmission (ignoring the pressed PTT or remote PTT button) in the event that it has been transmitting for sixty seconds to avoid monopolizing the channel. When audio transmission disable occurs, unique audible cue, one medium tone, is played for the user.

In the preferred embodiment, each headset has exactly the same form factor as existing standard army headsets. All electronics, batteries, etc are embedded within or onto the existing equipment. The headset is also compatible when worn with NBC mask(s) such as the M45, M50 and M53 with their hoods.

The operating range of the headset depends on the chipset. 100 meters LOS can be expected using a PCB track antenna.

AES encryption and key management are implemented.

As noted above, the system is designed to work as a mesh network, wherein each headset can communicate with any other headset in range. Moreover, as noted, if a headset within range receives a message for another headset, it can serve as a repeater to forward to message to the destination headset, which may be out of range of the transmitting headset.

Automatically repeating voice packets provides a means to extend the range of the system or make it more robust when operating in a challenging RF environment. When any headset within range receives a packet it will attempt to retransmit it providing that the headset has not already transmitted the packet and the received packet has been retransmitted less than 2 times. With this scheme a voice packet may experience three hops between headsets before final reception and demodulation.

The wireless communication module can be integrated into an interface module that is directly connected to a vehicular communications system, such as SOTAS, by cabling. The interface module is similar in design to the headset subsystem, except that the microphone and earpiece are discarded and all remaining electronics packaged within a conveniently small form factor. Preferably, the interface module is weatherproof and mountable on the exterior of a vehicle.

Audio normally destined for the Headset Earphone is routed to the audio interface of the vehicular communications system. When Audio is available to be sent to audio interface, the interface module automatically engages the PTT of the vehicular communications system. When Audio is no longer available to be sent, the PTT is released.

Audio received from audio interface of the vehicular communications system is compared to a threshold, and when the threshold is exceeded, the headset PTT function is engaged. Hysteresis on the order of 0.25 seconds is applied. The audio is then presented to the 802.15.4 MAC for transmission.

The interface module has a connector to interface with the management subsystem, and is optimized for use with the vehicular communication system volume control at mid range.

The interface module has an antenna matched to and optimized for efficiency in the band of operation.

In one example, the management subsystem consists of a laptop PC, and an interface cable to the headset. However, any device with suitable processing resources and user interface that has USB host capabilities could also be used as the management interface.

When connected to a Headset or the interface module, the management system provides several functions, including software download, software revision, reset capability, read RF Parameters, including channel assignment, assign RF Parameters, including Channel Assignment, read modem parameters, assign modem parameters, read CODEC parameters, assign CODEC Parameters, read Connectivity (list the Headsets that are reachable), read and display GPS position (of the Headsets that are reachable), and read/Initiate BIT (as available).

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Although, for convenience, the invention has been described in a military context, it will be appreciated that the invention is applicable not only to soldiers, but to anyone seeking effective communication in a similar peer to peer context.

We claim:

1. A wireless communication system, comprising:
   a plurality of headsets, each incorporating a wireless communications module comprising:
      a power supply, a microphone, a speaker, a wireless transceiver, a memory, and a processor responsive to instructions stored in the memory to control operation of the wireless communications module to establish a peer-to-peer mesh communication network,
   wherein each headset can communicate directly with any other headset within range without requiring connection to a central controller and with the wireless communications modules incorporated in the headsets acting as nodes in the network, and wherein the wireless communication module of each headset is configured to serve as a repeater to retransmit to rely received packet addressed to another headset in the network provided that the received packet has not already been retransmitted more than a certain number of times, and wherein the wireless communication module of each headset is further configured to:
   search a set of preconfigured channels for an operating channel of an existing communication network on power-up and if an existing communication network is found, join the existing communication network, and otherwise form a new communication network on a selected one of said preconfigured channels; and
   broadcast data messages to other members of the communication network containing link status and network knowledge information; and
   wherein one of said headsets in said communication network is configured to take on the role of network manager coordinating modem or RF changes based on said network knowledge information; and
   wherein at least one of the plurality of headsets forming a network is configured to set a timer, and upon expiry of the timer or another headset joining the network, scan all said preconfigured channels to look for another network to merge with said formed network.

2. A wireless communication system as claimed in claim 1, wherein said packet network is an IP network.

3. A wireless communication system as claimed in claim 2, wherein said network is based on an IEEE 802.15 air interface.

4. A wireless communication system as claimed in claim 1, further comprising an interface module for connection to an external radio communication system, and wherein said interface module includes a transceiver for establishing wireless communication with said headsets, wherein said interface module can be incorporated as part of the network including said headsets.

5. A wireless communication system as claimed in claim 1, wherein the electronic components of each wireless communication module are mounted on a printed circuit board conforming to the shape of an earpiece of the headset.

6. A wireless communication system as claimed in claim 1, further comprising a management interface for connection to, and for controlling operation of, said wireless communication modules.

7. A wireless communication system as claimed in claim 1, further comprising at least one stand-alone wireless controller including at least a push-to-talk button for remotely controlling operation of one of said wireless communications modules.

8. A wireless communication system as claimed in claim 7, wherein the stand-alone wireless controller comprises a wireless transceiver, a memory, and a processor responsive to instructions stored in the memory, to control operation of the wireless controller so that it acts as a node in the network.

9. A wireless communication system as claimed in claim 8, wherein the wireless controller includes a data interface.

10. A wireless communication system as claimed in claim 1, further comprising an active noise cancelation subsystem to reduce ambient noise.

11. A wireless communication system as claimed in claim 1, further comprising a stand-alone wireless controller, the stand-alone wireless controller comprising a wireless transceiver, a memory, and a processor responsive to instructions stored in the memory to control operation of the wireless controller, and a push-to-talk button for remotely controlling operation of a local said headset, and wherein the wireless controller is configured to act as a node in the network such that the wireless controller communicates with the wireless communications modules of other headsets in the network.

12. A headset for incorporation into a wireless communication system enabling communication among a group of users, incorporating a wireless communications module comprising a power source, a microphone, a speaker, a wireless transceiver, a memory, and a processor responsive to instructions stored in the memory to control operation of the wireless communications module to establish a peer-to-peer mesh communication network with like wireless communication modules wherein each headset can communicate directly with any other headset within range without requiring connection to a central controller, and wherein the wireless communication modules act as nodes in the network, and wherein the wireless communication module is configured to serve as a repeater to retransmit any received packet addressed to another headset in the network provided that the received packet has not already been retransmitted more than a certain number of times, and wherein the wireless communication module is further configured to:

search a set of preconfigured channels for an operating channel of an existing communication network on power-up and if an existing communication network is found, join the existing communication network, and otherwise form a new communication network on a selected one of said preconfigured channels; and     broadcast data messages to other members of the communication network containing link status and network knowledge information to permit one of said headsets in the communication network to take on the role of network manager coordinating modem or RF changes based on said network knowledge information contained in said data messages, and     when the headset acts as a network former to set a timer, and upon expiry of the timer or another headset joining the network, scan all said preconfigured channels to look for another network to merge with said formed network.

13. A headset as claimed in claim 12, wherein said packet network is an IP network.

14. A headset as claimed in claim 13, wherein said network is based on an IEEE 802.15 air interface.

15. A headset as claimed in claim 12, wherein the wireless communication module is configured to serve as a repeater to forward a received signal to the wireless communication module of another headset, thereby extending the effective range of other wireless communication modules in the network.

16. A headset as claimed in claim 12, wherein the electronic components of each wireless communication module are mounted on a printed circuit board conforming to the shape of an earpiece of the headset.

17. A headset as claimed in claim 12, further comprising at least one stand-alone wireless controller including at least a push-to-talk button for remotely controlling operation of one of said wireless communications modules.

18. A headset as claimed in claim 12, comprising a user interface residing on the headset itself.

19. A headset as claimed in claim 17, comprising a user interface residing on a linked wireless controller.

20. A headset as claimed in claim 12, further comprising user interface controls on the headset, and user interface controls on a linked wireless controller configurable to be mirrored to those on the headset.

21. A headset as claimed in claim 12, further comprising user interface controls on the headset, and user interface controls on a linked wireless controller that are configurable to be different to allow for extended functionality for the operator.

\* \* \* \* \*